United States Patent [19]
Dexter

[11] Patent Number: 5,423,234
[45] Date of Patent: Jun. 13, 1995

[54] SAW FILE GUIDE

[76] Inventor: Bruce J. Dexter, R.D. 1, Box 12, Sutton, Vt. 05867

[21] Appl. No.: 127,513

[22] Filed: Sep. 28, 1993

[51] Int. Cl.⁶ .............................................. B23D 63/10
[52] U.S. Cl. ......................................... 76/36; 76/31
[58] Field of Search ...................... 76/25.1, 31, 35, 36, 76/74

[56] References Cited

U.S. PATENT DOCUMENTS

| | | |
|---|---|---|
| 735,100 | 8/1903 | Hormby . |
| 827,623 | 7/1906 | Finger . |
| 1,806,222 | 5/1931 | Ross . |
| 2,755,559 | 7/1956 | Pearce .................................. 33/202 |
| 2,813,438 | 11/1957 | Paradis .................................... 76/31 |
| 3,766,807 | 10/1973 | Combs ..................................... 76/31 |
| 4,228,702 | 10/1980 | Stewart et al. ......................... 76/36 |

Primary Examiner—Douglas D. Watts
Attorney, Agent, or Firm—Jacobson, Price, Holman & Stern

[57] ABSTRACT

A guide which can be mounted to the teeth of a saw blade, for guiding a file used to sharpen the blade's teeth. The file guide comprises two spaced-apart, substantially parallel arms adapted to receive a saw blade therebetween. Each of the substantially parallel arms has a main arm portion and a secondary arm portion connected to one another by a preferably pivoted elbow portion. The file guide further comprises a guide member adapted to straddle the saw blade, and a tooth engaging member connected to, and disposed between, the secondary arm portions. The substantially parallel arms, guide member and tooth engaging member are arranged with respect to one another, such that the guide firmly engages a saw blade when the tooth engaging member and the guide member are brought against the teeth of the saw blade, with the saw blade being received between the substantially parallel arms. Preferably, rollers are mounted on the guide member, which rollers guide a file inserted therebetween. In addition, the file guide preferably also comprises mechanisms for adjusting the filing angle and depth, as well as the angular orientation of the main arm portions with respect to the secondary arm portions to compensate for the tooth spacing of different saw blades.

18 Claims, 3 Drawing Sheets

SAW FILE GUIDE

BACKGROUND OF THE INVENTION

The present invention relates to a guide which can be mounted to the teeth of a saw blade, for guiding a file used to sharpen the blade's teeth.

U.S. Pat. Nos. 4,228,702 to Stewart et al.; 3,766,807 to Combs; 2,755,559 to Pearce; 1,806,222 to Ross; 827,623 to Finger; and 735,100 to Hormby are exemplary of patents which disclose guides for positioning and guiding a file during reciprocal movement of the file in relation to saw teeth.

The Hormby patent, for example, discloses a structure in which the guide uses a pair of rollers of conical configuration with the rollers being vertically adjustable in relation to a support mounted on a base structure. The patents to Finger and Ross disclose a carriage on which a file is mounted with the carriage being slidably mounted on a support rod. The Pearce patent discloses a file guide for a chain saw in which rollers are utilized to support and guide a flat file. The Combs patent discloses a guide in the form of a plate having a notched edge portion associated with the saw teeth and file. The Stewart et al. patent discloses a file guide for a chain saw utilizing oppositely disposed rollers engaging and guiding the file.

None of these patents, however, discloses an arrangement in which a pair of rollers are supported on each side of the saw and receive the file therebetween with the guide including filing angle and depth adjustments and a tooth spacing adjustment, with a handle on one end of the guide which enables the file guide to be stabilized and to rotate the saw to the next filing position.

SUMMARY OF THE INVENTION

It is therefore a primary object of the present invention to overcome the disadvantages of the prior art, by providing a file guide having filing angle and depth adjustments, as well as a tooth spacing adjustment.

It is a further object of the present invention to provide a file guide having a handle at one end of the guide which enables the file guide to be stabilized and which facilitates rotation of a saw blade to the next filing position.

A still further object of the present invention is to provide a file guide which can be manipulated using only one hand, leaving the other hand free to maneuver the file itself.

Another object of the present invention is to provide a file guide that can be used equally as well by left and right handed persons.

Still another object of the present invention is to provide a file guide which can be moved from a first position along the circumference of a saw blade to a subsequent position along the circumference, secured in the subsequent position and pulled to effect rotation of the saw blade, all using only one hand.

Yet another object of the present invention is to provide a file guide which permits the removal of the file without the need to unclamp or unbolt the file from the guide.

To achieve these and other objects, the file guide of the present invention comprises two spaced-apart, substantially parallel arms adapted to receive a saw blade therebetween. Each of the substantially parallel arms has a main arm portion and a secondary arm portion connected to one another by a preferably pivoted elbow portion. The file guide further comprises a guide member adapted to straddle the saw blade, and a tooth engaging member connected to, and disposed between, the secondary arm portions. The substantially parallel arms, guide member and tooth engaging member are arranged with respect to one another, such that the guide firmly engages a saw blade when the tooth engaging member and the guide member are brought against the teeth of the saw blade, with the saw blade being received between the substantially parallel arms.

The guide member connects the two substantially parallel arms to one another, using the ends of the main arm portions which are opposite from the elbow portions. The guide member engages the particular tooth which is to be filed and includes means for guiding the file for substantially transverse motion with respect to the two substantially parallel arms. The means for guiding a file preferably comprise a plurality of rollers which receive the file therebetween. Preferably, the guide member also comprises a handle for facilitating manipulation and grasping of the guide, and for facilitating rotation of a saw blade to a subsequent filing position. In addition, adjustable means are provided for engaging the particular saw tooth which is to be filed, whereby a filing depth can be adjusted. By setting this adjustable means after filing one of the teeth, the other teeth on the blade can be uniformly filed to the same depth.

The secondary arm portions are preferably pivotally connected to the main arm portions so that the angular orientation of the secondary arm portions with respect to the main arm portions is selectively adjustable to compensate for the tooth spacing of different saw blades. In addition, means are provided for temporarily securing the secondary arm portions in a desired angular orientation with respect to the main arm portions.

The file guide also preferably comprises means for selectively adjusting the angular orientation of the guide member with respect to the particular tooth which is to be filed. Such an adjustment allows a desired filing angle to be achieved, which filing angle can be maintained for all subsequently filed teeth.

The file guide can further comprise at least one stabilizer knob mounted on each of the main arm portions and extending out between the main arm portions to engage any saw blade received therebetween. Each stabilizer knob has a selectively adjustable height to thereby accommodate saw blades having different thicknesses. The primary object of the stabilizer knobs is to prevent wobbling of the file guide after attachment to a saw blade.

The above and other objects and advantages will become more readily apparent when reference is made to the following description taken in conjunction with the accompanying drawings.

DETAILED DESCRIPTION OF THE PREFERRED EMBODIMENTS

Figure 1:
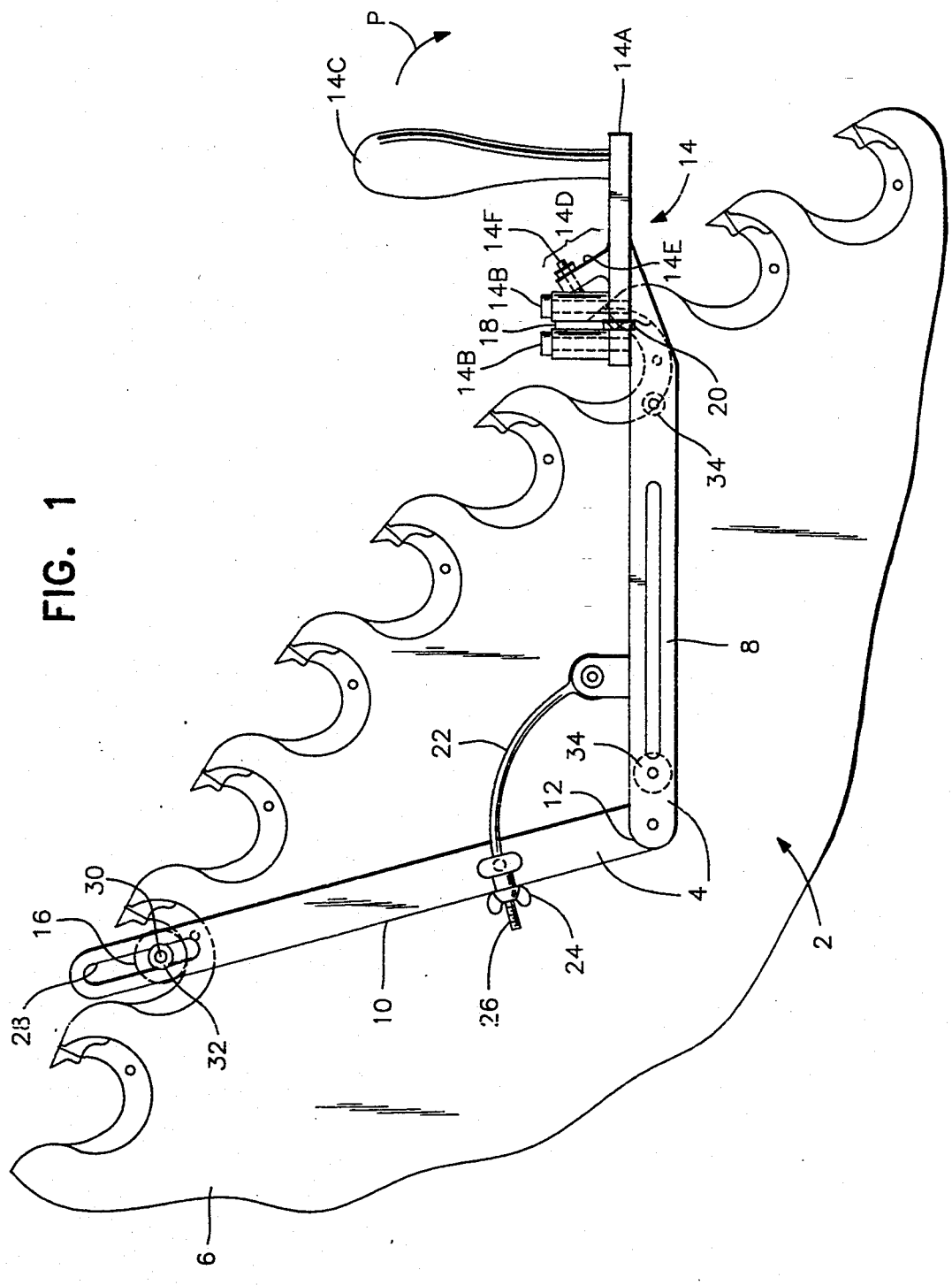
FIG. 1 is a side view of a preferred embodiment of a file guide according with the present invention, which file guide is shown mounted on a saw blade.

A preferred embodiment of the file guide according to the present invention will now be described with reference to FIGS. 1-3.

The file guide 2 comprises two spaced-apart, substantially parallel arms 4,4' adapted to receive a saw blade 6 therebetween. Each of the substantially parallel arms 4,4' has a main arm portion 8,8' and a secondary arm portion 10,10' connected to one another by a preferably pivoted elbow portion 12, 12'. The file guide 2 further comprises a guide member 14 adapted to straddle the saw blade 6, and a tooth engaging member 16 connected to, and disposed between, the secondary arm portions 10,10'.

The substantially parallel arms 4,4', guide member 14 and tooth engaging member 16 are arranged with respect to one another, such that the guide 2 firmly engages the saw blade 6 when the tooth engaging member 16 and the guide member 14 are brought against the teeth of the saw blade 6, with the saw blade 6 being received between the substantially parallel arms 4,4'.

The guide member 14 includes a platform 14A which connects the two substantially parallel arms 4,4' to one another, using the ends of the main arm portions 8,8' which are opposite from the elbow portions 12,12'. The guide member 14 engages the particular tooth 6A which is to be filed and includes four rollers 14B which receive a file 18 therebetween and guide the file 18 for substantially transverse motion with respect to the two substantially parallel arms 4,4'. This transverse motion is denoted by the arrow M in FIG. 2.

The platform 14A further comprises two base rollers 20, 20' mounted below and adjacent the four rollers 14B. The axes of rotation of the base rollers 20, 20' are substantially perpendicular to the axes of rotation of the four rollers 14B. In use, the base rollers 20,20' provide a substantially frictionless means for preventing the file 18 from falling out from between the four rollers 14B.

Preferably, the guide member 14 also comprises a handle 14C for facilitating manipulation and grasping of the guide 2, as well as rotation of the saw blade 6 to a subsequent filing position. In particular, rotation of the saw blade 6 is achieved by pulling down on the handle 14C as indicated by the arrow P of FIGS. 1 and 3. Although the handle 14C preferably extends perpendicularly up from the platform 14A with a progressively increasing diameter and a rounded distal end, it is understood that other handle configurations will suffice. In this regard, the handle 14C is not limited to the illustrated configuration.

The guide member 14 further comprises a filing depth adjustor 14D mounted to the platform 14A. Tire filing depth adjustor 14D preferably comprises an angled post 14E extending up from the platform 14A, and an elongated stop 14F threadedly received therein. The elongated stop 14F makes contact with the saw tooth 6A to be filed, and can be selectively extended to vary the filing depth of the tooth 6A by rotating the stop 14F with respect to the angled post 14E. Once a desired filing depth is achieved, the stop 14F can be left in this particular position during subsequent filings of other teeth, thereby achieving a uniform filing depth for all the teeth on the saw blade 6.

According to the preferred embodiment, the secondary arm portions 10,10' are pivotally connected to the main arm portions 8,8' so that the angular orientation of the secondary arm portions 10,10' with respect to the main arm portions 8,8' can be selectively adjusted to compensate for the tooth spacing of different saw blades. In addition, a curved bar 22 and a rotatably mounted wing nut 24 are provided for temporarily securing the secondary arm portion 10 in a desired angular orientation with respect to the main arm portion 8.

The curved bar 22 is pivotally mounted to the main arm portion 8 and extends toward the secondary arm portion 10 connected thereto. The curved bar 22 has a threaded distal end 26 opposite from its pivotal connection to the main arm portion 8.

The rotatably mounted wing nut 24 is internally threaded and is mounted rigidly and laterally to the secondary arm portion 10 for rotation with respect thereto. Rotation of the wing nut 24 while the threaded distal end 26 engages the internal threads of the wing nut 24, effects adjustment of the angular orientation between the main arm portion 8 and the secondary arm portion 10. In this regard, rotation of the wing nut 24 can be used to compensate for the tooth spacing of different saw blades.

The illustrated file guide 2 also includes a slot and bolt combination for selectively adjusting the angular orientation of the guide member 14 with respect to the particular tooth 6A which is to be filed. Such an adjustment allows a desired filing angle to be achieved, which filing angle can be maintained for all subsequently filed teeth. In particular, a slot 28 is longitudinally arranged in each of the secondary arm portions 10,10', and an adjustment bolt 30 is disposed through the slots 28. The bolt engages a nut 32 located adjacent one of the slots 28, and also passes through the tooth engaging member 16, so that when the adjustment bolt 30 is tightened, it frictionally secures the tooth engaging member 16 in a selectively chosen position along the slot 28. This selectively chosen position determines the filing angle between the guide member 14 and the tooth 6A.

The file guide 2 further comprises two stabilizer knobs 34 mounted on each of the main arm portions 8,8' and extending out between the main arm portions 8,8' to engage the saw blade 6 received therebetween. Each stabilizer knob 34 has a selectively adjustable height to thereby accommodate saw blades having different thicknesses. The primary object of the stabilizer knobs 34 is to prevent wobbling of the file guide 2 after attachment to a saw blade.

Preferably, the file guide 2 is made by aluminum casting, with the rollers 14B, 20, 20' being made of hardened steel. It is well understood, however, that the file guide 2 can be made from various other materials.

A preferred technique for using the guide 2 to guide a file along the teeth of a saw blade will now be described.

Initially, the filing depth and filing angle are adjusted, as is the angular orientation of the main arm portions 8,8' with respect to the secondary arm portions 10,10', the latter being pursuant to the tooth-spacing of the saw blade.

Figure 2:
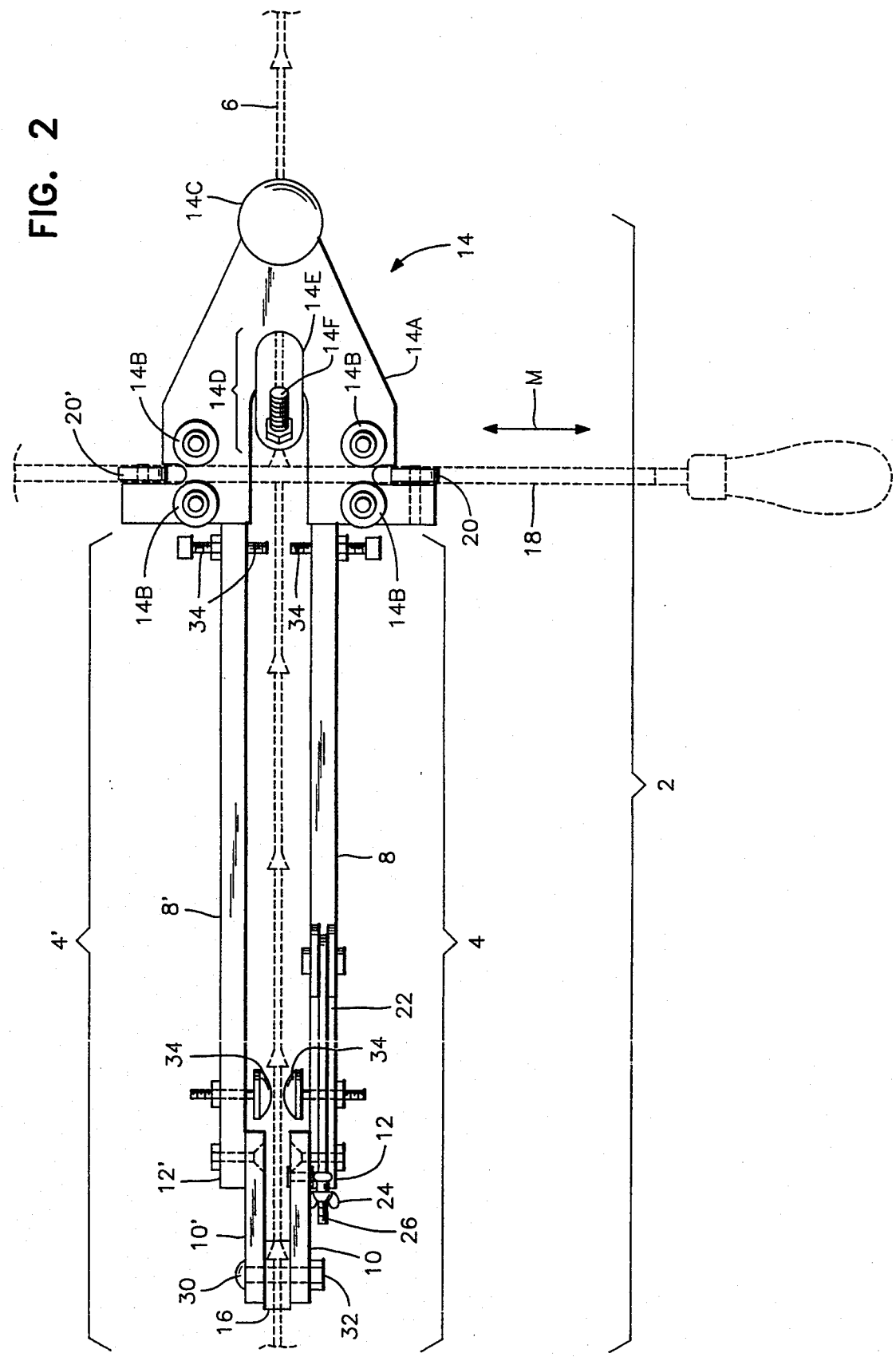
FIG. 2 is a top view of the file guide illustrated in FIG. 1.
Figure 3:
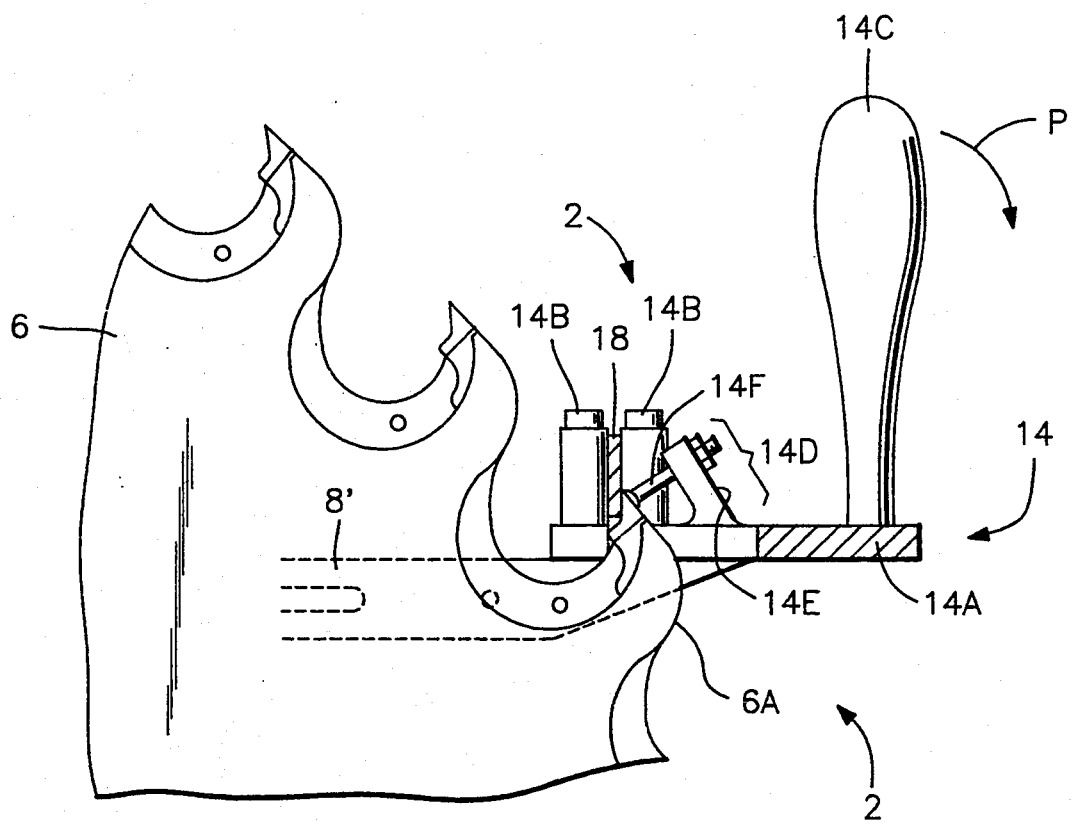
FIG. 3 is a cross section showing the guide member of the file guide illustrated in FIG. 1.

Next, the guide 2 is made to straddle the saw blade as shown in FIGS. 1-3, with the tooth engaging member 16 and the guide member 14 each engaging one of the saw teeth. The handle 14C can then be pulled down as indicated by arrow P to rotate the saw blade to a position which is most comfortable to the person using the device.

The stabilizer knobs 34 are then adjusted to snugly contact the saw blade and prevent wobbling of the guide 2.

Thereafter, a bastard file is inserted between the rollers 14B and is reciprocated to effect filing of the particular tooth which engages the guide member 14.

After the tooth is sufficiently filed, the bastard file can be withdrawn, and the handle 14C pulled down to rotate the saw blade a distance corresponding to the distance separating successive teeth on the blade.

The handle 14C is then manipulated using only one hand, to force the guide 2 slightly away from the saw blade, and then back into contact with the next tooth on the blade.

The bastard file is then reinserted and the filing operation effected on the next tooth. These steps of filing and rotating the blade are repeated until one works completely around the saw blade and all teeth are filed. Advantageously, this can be done without ever having to release one's grip of the file or one's grip of the guide 2.

Furthermore, if the file becomes clogged with filings, it can be removed easily and tapped or shaken to remove the filings and reinserted, without ever having to unclamp or unbolt the file.

Although the present invention has been described with reference to the above embodiment, it is understood that the invention is not limited to this embodiment; but rather, is only limited by the scope of the claims appended hereto.

I claim:

1. A guide for engaging the teeth of a saw blade and guiding a file which is used to sharpen the teeth, said guide comprising:

two spaced-apart, substantially parallel arms adapted to receive a saw blade therebetween, each of said substantially parallel arms having a main arm portion and a secondary arm portion, each of said main arm portions being connected to one of the secondary arm portions by an elbow portion;

a guide member adapted to straddle said saw blade and engage one of said teeth which is to be filed, said guide member connecting said two substantially parallel arms to one another by a first end of said main arm portions opposite from said elbow portion, said guide member having means for guiding a file for substantially transverse motion with respect to the two substantially parallel arms;

a tooth engaging member connected to, and disposed between, said secondary arm portions, wherein said guide firmly engages said saw blade when said tooth engaging member and said guide member are brought against the teeth of a saw blade, with the saw blade being received between said substantially parallel arms, and wherein said means for guiding a file comprises first and second pairs of rollers mounted on opposite lateral sides of said guide member, each of said first and second pairs of rollers having substantially parallel axes of rotation and being adapted to receive a file therebetween, said first and second pairs of rollers being aligned with one another such that a file passing between the first pair of rollers also passes between the second pair of rollers.

2. The guide of claim 1, wherein said guide member further comprises a handle for facilitating manipulation and grasping of the guide, and for facilitating rotation of a saw blade to a subsequent filing position.

3. The guide of claim 1, wherein said means for guiding a file further comprises:

a first base roller for preventing a file from falling below said first pair of rollers when the file is received therebetween, said first base roller being mounted adjacent said first pair of rollers and having an axis of rotation substantially perpendicular to the axes of rotation of said first pair of rollers; and a second base roller for preventing a file from falling below said second pair of rollers when the file is received therebetween, said second base roller being mounted adjacent said second pair of rollers and having an axis of rotation substantially perpendicular to the axes of rotation of said second pair of rollers.

4. The guide of claim 1, wherein said guide member further comprises adjustable means for engaging said one of the teeth which is to be filed, whereby a filing depth can be adjusted.

5. The guide of claim 1, wherein said main arm portions are not collinear with said secondary arm portions, so that an angle is defined between said main arm portions and said secondary arm portions.

6. A guide for engaging the teeth of a saw blade and guiding a file which is used to sharpen the teeth, said guide comprising:

two spaced-apart, substantially parallel arms adapted to receive a saw blade therebetween, each of said substantially parallel arms having a main arm portion and a secondary arm portion, each of said main arm portions being connected to one of the secondary arm portions by an elbow portion;

a guide member adapted to straddle said saw blade and engage one of said teeth which is to be filed, said guide member connecting said two substantially parallel arms to one another by a first end of said main arm portions opposite from said elbow portion, said guide member having means for guiding a file for substantially transverse motion with respect to the two substantially parallel arms;

a tooth engaging member connected to, and disposed between, said secondary arm portions, wherein said guide firmly engages said saw blade when said tooth engaging member and said guide member are brought against the teeth of a saw blade, with the saw blade being received between said substantially parallel arms, and wherein said secondary arm portions are pivotally connected to said main arm portions such that the angular orientation of the secondary arm portions with respect to the main arm portions can be selectively adjusted to compensate for the tooth spacing of different saw blades.

7. The guide of claim 6, and further comprising means for temporarily securing said secondary arm portions in a desired angular orientation with respect to said main arm portions.

8. The guide of claim 7, wherein said means for temporarily securing said secondary arm portions in a desired angular orientation comprise:

a curved bar pivotally mounted to at least one of said main arm portions and extending toward the secondary arm portion connected thereto, said curved bar having a threaded distal end opposite from its pivotal connection to said at least one main arm portion; and an internally threaded, rotatable means laterally mounted to the secondary arm portion connected to said at least one main arm portion, for threadedly engaging said distal end of the curved bar.

9. The guide of claim 6, and further comprising means for selectively adjusting the angular orientation of the guide member with respect to said one of the teeth which is to be filed, so that a desired filing angle is achieved.

10. A guide for engaging the teeth of a saw blade and guiding a file which is used to sharpen the teeth, said guide comprising:

two spaced-apart, substantially parallel arms adapted to receive a saw blade therebetween, each of said substantially parallel arms having a main arm portion and a secondary arm portion, each of said main arm portions being connected to one of the secondary arm portions by an elbow portion;

a guide member adapted to straddle said saw blade and engage one of said teeth which is to be filed, said guide member connecting said two substantially parallel arms to one another by a first end of said main arm portions opposite from said elbow portion, said guide member having means for guiding a file for substantially transverse motion with respect to the two substantially parallel arms;

a tooth engaging member connected to, and disposed between, said secondary arm portions, wherein said guide firmly engages said saw blade when said tooth engaging member and said guide member are brought against the teeth of a saw blade, with the saw blade being received between said substantially parallel arms; and means for selectively adjusting the angular orientation of the guide member with respect to said one of the teeth which is to be filed, so that a desired filing angle is achieved, wherein said means for selectively adjusting the angular orientation of the guide member with respect to said one of the teeth, comprises:

a slot longitudinally arranged in each of said secondary arm portions;

means passing through said slot in each of said secondary arm portions and also passing through said tooth engaging member, for frictionally securing said tooth engaging member in a selectively chosen position along said slot which yields the desired filing angle.

11. The guide of claim 10, and further comprising at least one stabilizer knob mounted on each of the main arm portions and extending out between the main arm portions to engage any saw blade received between said main arm portions, said at least one stabilizer knob having a selectively adjustable height to thereby accommodate saw blades having different thicknesses.

12. A guide for engaging the teeth of a saw blade and guiding a file which is used to sharpen the teeth, said guide comprising:

two spaced-apart, substantially parallel arms adapted to receive a saw blade therebetween, each of said substantially parallel arms having a main arm portion and a secondary arm portion connected thereto by an elbow portion, each of said main arm portions being pivotally connected at said elbow portion to one of the secondary arm portions such that the angular orientation of the secondary arm portions with respect to the main arm portions can be selectively adjusted to compensate for the tooth spacing and diameters of different saw blades;

a guide member adapted to straddle said saw blade and engage one of said teeth which is to be filed, said guide member connecting said two substantially parallel arms to one another by a first end of said main arm portions opposite from said elbow portion, said guide member having means for guiding a file for substantially transverse motion with respect to the two substantially parallel arms, and also having adjustable means for engaging said one of the teeth which is to be filed whereby a filing depth can be adjusted;

a tooth engaging member connected to, and disposed between, said secondary arm portions, means for selectively adjusting the angular orientation of the guide member with respect to said one of the teeth which is to be filed, said means for selectively adjusting the angular orientation of the guide member comprising a slot longitudinally arranged in each of said secondary arm portions and means passing through said slot in each of said secondary arm portions and also passing through said tooth engaging member, for frictionally securing said tooth engaging member in a selectively chosen position along said slot which yields a desired filing angle, wherein said guide firmly engages said saw blade when said tooth engaging member and said guide member are brought against the teeth of a saw blade, with the saw blade being received between said substantially parallel arms.

13. The guide of claim 12, wherein said guide member further comprises a handle for facilitating manipulation and grasping of the guide, and for facilitating rotation of a saw blade to a subsequent filing position.

14. The guide of claim 12, wherein said means for guiding a file comprises first and second pairs of rollers mounted on opposite lateral sides of said guide member, each of said first and second pairs of rollers having substantially parallel axes of rotation and being adapted to receive a file therebetween, said first and second pairs of rollers being aligned with one another such that a file passing between the first pair of rollers also passes between the second pair of rollers.

15. The guide of claim 14, wherein said means for guiding a file further comprises:

a first base roller for preventing a file from falling below said first pair of rollers when the file is received therebetween, said first base roller being mounted adjacent said first pair of rollers and having an axis of rotation substantially perpendicular to the axes of rotation of said first pair of rollers; and a second base roller for preventing a file from falling below said second pair of rollers when the file is received therebetween, said second base roller being mounted adjacent said second pair of rollers and having an axis of rotation substantially perpendicular to the axes of rotation of said second pair of rollers.

16. The guide of claim 12, and further comprising means for temporarily securing said secondary arm portions in a desired angular orientation with respect to said main arm portions.

17. The guide of claim 16, wherein said means for temporarily securing said secondary arm portions in a desired angular orientation comprises:

a curved bar pivotally mounted to at least one of said main arm portions and extending toward the secondary arm portion connected thereto, said curved bar having a threaded distal end opposite from its pivotal connection to said at least one main arm portion; and an internally threaded, rotatable means laterally mounted to the secondary arm portion connected to said at least one main arm portion, for threadedly engaging said distal end of the curved bar.

18. The guide of claim 12, and further comprising at least one stabilizer knob mounted on each of the main arm portions and extending out between the main arm portions to engage any saw blade received between said main arm portions, said at least one stabilizer knob having a selectively adjustable height to thereby accommodate saw blades having different thicknesses.

* * * * *